ized Material

(12) United States Patent
Holland

(10) Patent No.: US 8,658,127 B2
(45) Date of Patent: Feb. 25, 2014

(54) METHOD OF MANUFACTURING MESOPOROUS ZEOLITE AGGLOMERATES

(75) Inventor: Brian T. Holland, Oak Park, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 12/652,117

(22) Filed: Jan. 5, 2010

(65) Prior Publication Data
US 2010/0104500 A1     Apr. 29, 2010

Related U.S. Application Data

(63) Continuation of application No. 11/198,786, filed on Aug. 5, 2005, now abandoned.

(51) Int. Cl.
*C01B 33/36* (2006.01)
*C01B 39/02* (2006.01)
*C01B 39/00* (2006.01)

(52) U.S. Cl.
USPC ........... 423/700; 423/701; 423/702; 423/704; 423/705

(58) Field of Classification Search
USPC ................................. 423/700–718
See application file for complete search history.

(56) References Cited

U.S. PATENT DOCUMENTS

| | | | | | |
|---|---|---|---|---|---|
| 4,377,502 | A | * | 3/1983 | Klotz | 502/77 |
| 4,931,312 | A | * | 6/1990 | de Leeuw et al. | 427/64 |
| 5,336,648 | A | * | 8/1994 | Hall et al. | 502/61 |
| 5,863,516 | A | | 1/1999 | Otterstedt | |
| 6,669,924 | B1 | * | 12/2003 | Kaliaguine et al. | 423/702 |
| 7,323,100 | B2 | * | 1/2008 | Espinoza et al. | 208/111.3 |
| 2003/0018228 | A1 | * | 1/2003 | Vaughn et al. | 585/500 |

OTHER PUBLICATIONS

Holland, Brian T. et al., Dual templating of macroporous silicates with zeolitic microporous frameworks, 1999, J. Am. Chem. Soc., 121, pp. 4308-4309.*
Brinker, C. J. & Scherer, G. W., Sol-Gel Science—The Physics and Chemistry of Sol-Gel Processing, Academic Press, San Diego, CA, 1990, pp. 200-203.
Brunauer, S., The Adsorption of Gases and Vapors, vol. 1—Physical Adsorption, Princeton University Press, Princeton, NJ, 1943, pp. 115-120.
Cartlidge et al., "Ternary mesoporous structure of ultrastable zeolite CSZ-1," Zeolites, vol. 9, 1989, pp. 346-349.
Corkery & Ninham, "Low-temperature synthesis and characterization of a stable colloidal TPA-silicalite-1 suspension," Zeolites, vol. 18, 1997, pp. 379-386.
Coudurier et al., "Uses of I. R. Spectroscopy in identifying ZSM Zeolite Structure," Journal of Chemical Society, Chemical Communications, 1982, pp. 1413-1415.
Doyle et al., "Ultra-thin zeolite films prepared by spin-coating Silicate-1 precursor solutions," Chemical Physical Letters, vol. 382, 2003, pp. 404-409.

Groen et al., "Mesoporosity development in ZSM-5 zeolite upon optimized desilication conditions in alkaline medium," Colloids and Surfaces A: Physiochemical Engineering Aspects, vol. 241, 2004, pp. 53-58.
Jansen et al., "Identification of ZSM-type and other 5-ring containing zeolites by i.r. spectroscopy," Zeolites, vol. 4, 1984, pp. 369-372.
Kim et al., "Colloid-Imprinted Carbons as Templates for the Nanocasting Synthesis of Mesoporous ZSM-5 Zeolite," Chemical Materials, vol. 15, 2003, pp. 6664-1668.
Liu & Pinnavala, "Aluminosilicate Nanoparticles for Catalytic Hydrocarbon Cracking," Journal of American Chemical Society, vol. 125, 2003, pp. 2376-2377.
Mintova & Bein, "Microporous Films Prepared by Spin-Coating Stable Colloidal Suspensions of Zeolites," Advanced Materials, vol. 13, No. 24, 2001, pp. 1880-1883.
Persson et al., "Synthesis of stable suspensions of discrete colloidal zeolite (Na, TPA) ZSM-5 crystals," Zeolites, vol. 15, 1995, pp. 611-619.
Ravishankar et al., "Characterization of Nanosized Material Extracted from Clear Suspensions for MFI Zeolite Synthesis," Journal of Physical Chemistry B, vol. 103, 1999, pp. 4960-4964.
Ravishankar et al., "Physicochemical Characterization of Silicalite-1 Nanophase Material," Journal of Physical Chemistry B, vol. 102, 1998, pp. 2633-2639.
Scholle et al., "Characterization of Intermediate TPA-ZSM-5 Type Structures during Crystallization," Applied Catalysts, vol. 17, 1985, pp. 233-259.
Song et al., "Size-Dependent Properties of Nanocrystalline Silicalite Synthesized with Systematically Varied Crystal Sizes," Langmuir, vol. 20, 2004, pp. 4696-4702.
Song et al., "Synthesis, Characterization, and Absorption of Nanocrystalline ZSM-5y," Langmuir, vol. 20, 2004, pp. 8301-8306.
Tao et al., "Template synthesis and characterization of mesoporous zeolites," Colloids and Surfaces A: Physiochemical Engineering Aspects, vol. 241, 2004, pp. 75-80.
Tsay & Chiang, "The synthesis of colloidal zeolite TPA-silicalite-1," Microporous and Mesoporous Materials, vol. 26, 1998, pp. 89-99.
van de Graaf et al., "Permeation of weakly adsorbing components through a silicalite-1 membrane," Chemical Engineering Science, vol. 54, 1999, pp. 1081-1092.
Vogel et al., "The synthesis of cresol from toluene and N2O on H[A1]ZSM-5: minimizing the product diffusion limitation by the use of small crystals," Catalysis Letters, vol. 79, Nos. 1-4, 2002, pp. 107-112.
Wang et al., "Surface Patterned Porous Films by Convection-Assisted Dynamic Self-Assembly of Zeolite Nanoparticles," Langmuir, vol. 17, 2001, pp. 2572-2574.
Wang et al., "Colloidal suspension of template-removed zeolite nanocrystals," Chemical Communications, 2000, pp. 2333-2334.
Yamamura et al., "Synthesis of ZSM-5 zeolite with small crystal size and its catalytic performance for ethylene oligomerization," Zeolites, vol. 14, 1994, pp. 643-649.

* cited by examiner

*Primary Examiner* — Bijay Saha
(74) *Attorney, Agent, or Firm* — Edward O. Yonter

(57) ABSTRACT

A method of preparing a mesoporous zeolite material is disclosed. The method comprises forming template-occluded primary metal-doped silicate particles having an amorphous structure and aggregating the particles into mesoporous agglomerates. The amorphous structure is further transformed into a microporous nanocrystalline zeolite structure, thereby forming a mesoporous zeolitic material. Forming the mesoporous zeolite material includes removing the template from the template-occluded particles.

7 Claims, No Drawings

METHOD OF MANUFACTURING MESOPOROUS ZEOLITE AGGLOMERATES

CROSS REFERENCE TO RELATED APPLICATION

This is a continuation application of U.S. patent application Ser. No. 11/198,786, entitled "Mesoporous Nanocrystalline Zeolite Composition and Preparation from Amorphous Colloidal Metalosilicates," filed on Aug. 5, 2005, now abandoned, which is incorporated herein by reference in its entirety.

FIELD OF THE INVENTION

This invention relates generally to methods of making mesoporous zeolite agglomerate materials. More specifically, the invention relates to forming template-occluded primary amorphous particles and aggregating those particles into mesoporous agglomerate materials.

BACKGROUND OF THE INVENTION

Crystalline molecular sieves are widely used as catalysts in the industry since they possess catalytically active sites as well as uniformly sized and shaped micropores that allow for their use as shaped selective catalysts in, for instance, oil refining, petrochemistry and organic synthesis. However, due to the pore size constraints, the unique catalytic properties of zeolites are limited to reactant molecules having kinetic diameters below 10 angstroms.

A series of mesoporous molecular sieves with increased diameters were disclosed in U.S. Pat. Nos. 5,057,296 and 5,102,643. These molecular sieves overcome the limitation of microporous zeolites and allow the diffusion of larger molecules. These materials, however, are amorphous solids. Amorphous silica-aluminas have much weaker acid sites than zeolites and thus do not exhibit the spectacular catalytic properties of acidic zeolites. Moreover, their hydrothermal stability is low and, as a consequence, their industrial use as catalysts is very limited Improved metal-containing colloidal compositions that possess the stability to undergo further processing to mesoporous ZSM-5 material ("meso-ZSM-5") have commercial significance.

SUMMARY OF THE INVENTION

High surface area mesoporous zeolites are prepared from stable metallocolloidal compositions capable of being further processed. Colloidal compositions having high metal loadings based on silica dispersed within the silicate are starting materials for preparing mesoporous ZSM-5 crystals having characteristics of industrial significance.

DETAILED DESCRIPTION OF THE INVENTION

Definitions

"About" means within 50%, preferably within 25%, and more preferably within 10% of a given value or range. Alternatively, the term "about" means within an acceptable standard error of the mean, when considered by one of ordinary skill in the art.

"Colloid" and other like terms including "colloidal," "sol," and the like refer to a two-phase system having a dispersed phase and a continuous phase. The colloids of the present invention have a solid phase dispersed or suspended in a continuous or substantially continuous liquid phase, typically an aqueous solution. Thus, the term "colloid" encompasses both phases whereas "colloidal particles" or "particles" refer to the dispersed or solid phase.

"Stable" means that the solid phase of the colloid is present, dispersed throughout the medium, and stable throughout this entire pH range with effectively no precipitate.

"Doping" refers to a process of incorporating silicic acid with a metal component dispersed into the framework of colloidal silica.

"Heel" refers to an aqueous basic solution in the doping process that at least includes a quaternary amine or an alkaline agent.

"Zeolite" refers generally to crystalline porous metal-doped silicates. This crystal not only contains a number of pores various diameters, but also has an extremely high mechanical strength because of its crystal structure. These physical properties of zeolite are excellent as a material for a semiconductor porous film.

The mesoporous zeolitic material according to the invention has a stereoregular arrangement of uniformly-sized mesopore walls having a stereoregular arrangement of uniformly-sized micropores.

The metallosilicate colloids which are used as starting material for preparing the mesoporous ZSM material are described in U.S. patent application Ser. No. 10/827,214, "Colloidal Compositions and Methods of Preparing Same," currently pending. The first synthetic method of producing a silica colloid provides a first step of producing a stabilizing component in an alkaline solution, followed by adding a silicic acid solution to the alkaline solution, and forming a colloid of silica particles wherein the stabilizing component is dispersed throughout the silicate particle. A cationic metal component is optionally added to the stabilizer-containing alkaline solution. In this scenario, the addition of silicic acid solution to the alkaline solution provides a colloid of silica particles having both the stabilizing component and the metal component homogenously dispersed within one or more of the silicate particles. The resultant silica colloid are amorphous and spherical in shape and carries an increased amounts of metal ranging from about 0.0001 wt % to about 35 wt %, based on silica. Such compositions are further processed to produce nanocrystalline mesoporous zeolites.

An alternative method of preparing a metal-containing silica colloid is also provided wherein a silicic acid solution is reacted with a cationic metal component to form a metal silicate solution. The metal silicate solution is subsequently added to an alkaline solution to form a colloid of metal silicate particles. Reacting the silicic acid solution with the metal component forms a metal-silicate monomer that is subsequently polymerized as the metal silicate solution is added to the alkaline solution. This procedure provides control for location of a metal component within the metal-containing silica colloid. The metal silicate solution and the silicic acid solution can be selectively added to the alkaline solution to form a colloid of silica particles containing metal that is dispersed within one or more of the particles. Alternatively, the silicic acid solution can be added to the alkaline solution before the metal silicate solution to form a colloid of silica particles having a silica core and metal dispersed within an outer or exterior layer of each particle. Moreover, the metal silicate solution and the silicic acid solution can be added to the alkaline solution in an alternating manner to form a colloid of silica particles having a number of layers, wherein the layers alternate between metal containing layers and layers containing only silica in a repeat or successive manner.

An additional synthetic scheme is disclosed wherein a colloidal composition is prepared from a heel solution including a stabilizer; preparing a silicic acid solution; and mixing and further processing the heel solution and the silicic acid solution to form the colloidal composition.

These methods provide the primary particles for further processing into ZSM-5 nanocrystals. Upon calcination, the $TPA^+$ is removed and both micropores and mesopores are generated.

Starting particles for the mesoporous ZSM-5 are provided by adding a silicic acid solution to a reaction vessel that includes a heel solution having an aqueous solution containing a metal component and a stabilizing component to form a colloid of silica particles. In an embodiment, the stabilizer is an amine or quaternary compound. Nonlimiting examples of amines suitable for use as the stabilizer include dipropylamine, trimethylamine, triethylmine, tri-n-propylamine, diethanolamine, monoethanolamine, triethanolamine, diisobutylamine, isopropylamine, diisopropylamine, dimethylamine, ethylenediaminetetraacetic acid, pyridine, the like, and combinations thereof.

The metal can include any suitable material and be derived from any suitable material including metal salts that are soluble or substantially soluble in an aqueous solution. In an embodiment, the metal includes an alkali metal, an alkaline earth metal, a $1^{st}$ row transition metal, a $2^{nd}$ row transition metal, a lanthanide, and combinations thereof. Aluminum, cerium, titanium, tin, zirconium, zinc, copper, nickel, molybdenum, iron, rhenium, vanadium, boron, the like, and any combination thereof are applicable.

The initial silica colloid is capable of supporting from about 0.0001 wt % to about 35 wt % metal, based on silica. The metal-stabilized silica solid phase also demonstrates increased stability and remains stable in a pH range of about 1 to about 14. The solid phase in an embodiment is amorphous and has a number of particles that are generally spherical in shape. The colloidal particles have a diameter in the range of about 2 nanometers (nm) to about 1,000 nm pursuant to an embodiment.

The starting particles may be prepared from silicic acid having a metal component disperse into the framework of colloidal silica (i.e., doping). The method includes preparing a heel. The heel includes an aqueous solution that at least includes a quaternary amine as defined herein or an alkaline agent. Suitable alkaline agents include, for example, NaOH, KOH, $NH_4OH$, the like, and combination thereof.

The metal silicate solution is subsequently added to the heel to form the colloid. During particle formation, the $OH^-$ present in the heel catalyzes the copolymerization of the cationic metal component and silicate ($SiO_4^-$) from the silicic acid. This produces a colloid with the metal dispersed within the silicate (i.e., incorporated into the particle framework as discussed above), such as having a homogenous distribution of the metal component throughout the entire solid phase of the colloid. According to this synthesis procedure pursuant to an embodiment, metal silicate colloids of the present invention can have a metal content from about 0.0001 wt % to about 2 wt %, based on silica. The metal silicate colloids are amorphous and generally spherical in shape, wherein the particles have an effective diameter or particle size from about 2 nm to about 1,000 nm in an embodiment. The metal silicate colloids are stable at a pH range from about 1 to about 14, exhibiting effectively no precipitation in this range. The skilled artisan will appreciate that the size of the colloidal particles can be adjusted by varying the addition time of the metal silicate solution to the heel.

As previously discussed, the above-described synthesis procedure can be utilized to effectively control the location of the method and loading thereof within the colloidal particles. In an embodiment, the metal silicate solution and the silicic acid solution are selectively added to the heel to control the position of the metal within the solid phase of the colloid as desired. Both silicic acid solution and metal silicate solution can be added to the heel to initiate particle formation or to grow or otherwise increase the size of a pure silica particle initially added to the heel. For example, the metal silicate solution is added to the heel before the silicic acid solution in an embodiment. This addition sequence yields a metal containing silica colloid wherein the metal is dispersed in a core or interior layer of the colloidal particle. The subsequent addition of the silicic acid can be used to cover the interior metal-containing portion of the particle with a layer containing on silica without the metal.

Alternatively, the silicic acid solution can be added to the heel prior to the addition of the metal silicate solution in an embodiment. This addition sequence yields colloidal particles having a core or interior composed of silica. The metal silicate solution can then be added to coat the silica particle to produce a particle containing metal on an exterior surface or outer layer of the particle wherein the metal is dispersed within this particle layer. The multiple layered colloid particles of the present invention are generally spherical in shape and have an effective particle size of about 2 nm to about 1,000 nm according to an embodiment.

The colloidal compositions prepared by the above-identified methods are processed to form a crystalline structure, such as a crystalline silicate, a crystalline metallosilicate including a zeolite, the like and combinations thereof. Continued hydrothermal treatment at suitable temperatures and over a suitable period of time provides a more crystalline silicate including metallosilicates, such as zeolites, from the colloidal compositions described-above wherein the colloidal composition includes silicate and a stabilizer with or without a metal dispersed within the silicate.

According to an embodiment, if the heel in the second synthesis procedure is replaced with an organic cation such as those used in synthesis procedure one (e.g., a stabilizer including tetramethylammonium hydroxide (TMAOH), tetrapropylammonium hydroxide (TPAOH), tetraethylammonium hydroxide (TEAOH), and/or the like), continued hydrothermal treatment after the silicic acid or metal/silicic acid containing solution has been added, can result in the formation of a mesoporous zeolite material.

Doped colloidal silica is useful in multitudinous industrial applications including, for example, dental applications, protein separation, molecular sieves, nanoporous membranes, wave guides, photonic crystals, refractory applications, clarification of wine and juice, chemical mechanical planarization of semiconductor and disk drive components, catalyst supports, retention and drainage aids in papermaking, fillers, surface coatings, ceramic materials, investment casting binders, flattening agents, proppants, cosmetic formulations, particularly sunscreens, and polishing abrasives in the glass, optical, and electronics and semiconductor industries. The form of silica used in a particular application depends in large part on the silica particle's size and porosity characteristics. Doped colloidal silica having the desired characteristics is readily prepared according to the method of this invention.

In an embodiment, the industrial application is selected from the group consisting of catalyst supports, retention and drainage aids in papermaking, fillers, flattening agents, and polishing abrasives.

The present invention will be further understood with reference to the following illustrative examples according to various embodiments without limitation.

Preparation of Amorphous Mesoscopic Metal-Doped Silicate Colloids

Synthesis Procedure One

A 5 wt % tetramethylammonium hydroxide (20-25 wt %) solution was added to a 12-gallon reactor along with 10.23 wt % of deionized (DI) water. A 030 wt % aluminum chlorohydrate (50 wt %) solution was added to 19.82 wt % DI water. The aluminum chlorohydrate solution was then added to the reactor at room temperature at a rate of 200 mL/min. The reactor was heated to 100° C. Then, 64.25 wt % silicic acid was added to the reactor at a ramp rate of 100-220 mL/min over 3.25 hours. As shown below, Table 1 lists the physical characteristics of the colloidal aluminosilicate made in the 12-gallon reactor after it was concentrated by ultra-filtration.

TABLE 1

| Concentrated Colloidal Aluminosilicate (12 gallon reactor) | Results |
| --- | --- |
| Solids wt % (specific gravity) | 25.30 |
| $Al_2O_3 \cdot SiO_2$ wt % (ash) | 24.72 |
| Solids wt % (removing water) "includes organic moiety" | 29.75 |
| PH | 11.02 |
| Specific Gravity | 1.1671 |
| Conductance (mhos) | 7,100 |
| Particle Size (nm), Titration | 5.00 |
| wt % $Al_2O_3$ (BOS), ICP | 3.93 |

Synthesis Procedure Two
1. Preparation of the Aluminum Containing Solutions:

Monomeric containing aluminum solution: A 0.37 M $AlCl_3 \cdot 6H_2O$ solution was prepared with a pH of 2.2 and was used as prepared as further described below.

Polyvalent aluminum containing solution: A second solution of 0.50 M $AlCl_3 \cdot 6H_2O$ was prepared. This solution was passed through an ion exchange column containing an anion exchange resin (Dowex 550A (OH⁻)). 100 g of $AlCl_3 \cdot 6H_2O$ solution was passed through 100 mL of resin. The pH of the aluminum containing solution was ca. 3.4 after being passed through the column. Aluminum chlorohydrate can also be used.
2. Preparation of the Silicic Acid:

25.00 g of (sodium silicate) was added to 57.37 g of DI water. The solution was passed through a column containing a cation exchange resin (Dowex 650C (H⁺)). About 40 mL of resin for 100 g of diluted sodium silicate solution was used to produce a silicic acid solution. To the silicic acid solution, a suitable amount of aluminum containing solution to produce the desired concentration (ppm) of aluminum based on silica (BOS) was added as detailed below.
3. Preparation of the Metallosilicate Colloids:

Example 1

The silicic acid solution/monomeric aluminum solution (2.93 g of 0.37 M $AlCl_3 \cdot 6H_2O$ solution) was added to a caustic heel containing 0.30 g of NaOH (50 wt %) in 14.40 g of DI water over a 5.0 hours ramp. A total of 68.57 g of silicic acid solution/aluminum solution was added.

Example 2

The silicic acid solution/polyvalent aluminum solution (3.02 g of 0.50 M $AlCl_3 \cdot 6H_2O$ anion-exchanged solution) was added to a caustic heel containing 0.30 g of NaOH (50 wt %) in 14.20 g of DI water over a 5.0 hour ramp. A total of 68.57 g of silicic acid solution/aluminum solution was added.

Example 3

The silicic acid solution/polyvalent aluminum solution (3.02 g of 0.50 M $AlCl_3 \cdot 6H_2O$ anion-exchanged solution) was added to a caustic heel containing 0.30 g of NaOH (50 wt %) in 14.20 g of Example 2 over a 5.0 hour ramp. A total of 68.57 g of silicic acid solution/aluminum solution was added.

Example 4

The silicic acid solution/aluminum solution (3.02 g of 0.50 M $AlCl_3 \cdot 6H_2O$ anion-exchanged solution) was added to a caustic heel containing 0.30 g of NaOH (50 wt %) in 14.20 g of Example 3 over a 5.0 hour ramp. A total of 68.57 g of silicic acid solution/aluminum solution was added.

Example 5

Pilot Plant Synthesis

The silicic acid solution/aluminum solution (0.67 g of a 0.87 M solution of aluminum chlorohydrate) was added to a caustic heel containing 0.11 g NaOH (50 wt %) in 3.82 g of 20 nm silica sol in 8.18 g of DI water over a 4.75 hours ramp. The reaction was heated at 93° C. A total of 87.89 g of silicic acid solution/aluminum solution was added. The final product was cation-exchanged to remove excess sodium, large particle filtered (LPC) and pH adjusted to 6.4.

Example 6

Cerium Doped Silica Colloids

A solution of 0.50 M $Ce_2(CO_3)_3$ was prepared by adding 46 g $Ce_2(CO_3)_3$ into 100 mL DI water then adding 1N HCl until dissolved. The solution was then topped up to 200 mL with DI water.

A silicic acid solution was prepared where 200 g of (sodium silicate) was added to 1,000 g of DI water. The solution was passed through a column containing a cation exchange resin (Dowex 650C (H⁺)). About 40 mL of resin for 100 g of diluted sodium silicate solution was used.

To the silicic acid solution, an amount of the cerium containing solution was added to provide the desired concentration (ppm) of cerium based on silica (BOS) as described below.

The silicic acid solution/cerium solution (6.2 ml of 0.5 M $Ce_2(CO_3)_3$ solution) was added to a caustic heel containing 5 g of KOH (45 wt %) in 200 g of DI water over a 5.0 hour ramp. A total of 1,200 g of silicic acid solution/cerium solution was added to produce the cerium-doped silica colloids Example 7

Titanium-Doped Silica Colloids

A titanium containing solution was prepared. In particular, a solution of 0.50 M $TiCl_4$ was prepared by slowly adding 100 mL deionized water into a beaker containing 9.4 g $TiCl_4$ and 10 ml isopropyl alcohol.

The silicic acid was prepared in the same fashion as described in Example 6. To the silicic acid was added an amount of the titanium containing solution to produce the desired concentration (ppm) of titanium based on silica (BOS) as illustrated below.

The silicic acid solution/titanium solution (12.6 mL of 0.5 M TiCl$_4$ solution) was added to a caustic heel containing 5 g of KOH (45 wt %) in 200 g of deionized water over a 5.0 hour ramp. A total of 1,200 g of silicic acid solution/cerium solution was added to produce the titanium doped silica colloid.

Example 8

Zinc Doped Silica Colloids

The zinc containing solution used in this procedure was a commercially-available product, namely 1N Zn(NO$_3$)$_2$. The silicic acid was prepared in the same fashion as described in Example 6. To the silicic acid was added an amount of zinc containing solution to provide the desired concentration (ppm) of zinc based on silica (BOS). The silicic acid solution/zinc solution (6 ml of 1 M Zn(NO$_3$)$_2$ solution) was added to a caustic heel containing 5 g of KOH (45 wt %) in 200 g of DI water over a 5.0 hour ramp. A total of 1,200 g of acid sol/cerium solution was added to produce the zinc doped silica colloid.

Synthesis Procedure Three
Preparation of Crystalline Silicate and Metallo Silicate Colloids:

Example 9

Colloidal Silicalite-1 was synthesized with a narrow particle size distribution from a mole composition of:
1TPAOH:1.9SiO$_2$:109H$_2$O
The source of silica was silicic acid. The reactor vessel was charged with a 20-25 wt % solution of TPAOH, which was heated to 90° C. To this, the silicic acid was added over 3 hours. A clear solution resulted, which was heated for 18 hours.

Example 10

Colloidal ZSM-5 was synthesized with a narrow particle size distribution from a mole composition of:

65TPAOH:125SiO$_2$:1Al$_2$O$_3$:7,000H$_2$O

The source of silica was silicic acid. The reactor vessel was charged with a 20-25 wt % solution of TPAOH, which was heated to 90° C. To this the aluminum/silicic acid solution was added over 2 hours. A clear solution resulted, which was heated for 24 hours.
Metallosilicate Colloids:

Various prepared metal-doped samples with the different heels, pH of the different metal containing solutions, amounts of metal added to the acid sol based on silica (BOS) and a variety of characterization techniques can be used to determine particle size and the extent, if any, agglomeration.

In general, the metal-doped colloids described above and made pursuant to various embodiments exhibit good stability in the pH range 3-9. For example, a stability test was conducted on the filtered and cation deionized aluminosilicate colloid of Example 5. The pH was adjusted to 4.1, 6.5 and 8.5 and effective particle diameters were measured (QELS) before and after heat treatment for two weeks at 60° C. No gelation occurred with these samples after heat treatment and the particle diameters remained essentially the same.
Characterization of Metal-Doped Silicate and ZSM Nanocrystals SEM was used to determine the structure of the amorphous colloid and meso-ZSM-5. Powder x-ray diffraction (PXRD), TGA, TEM and FT-IR were used to show the presence of ZSM-5, where as nitrogen sorption measurements were used to show the presence of both micropores and mesopores.

Initial primary particles were synthesized from a starting solution of the following molar composition:

20TPAB$_{2B}$O:1AlB$_{2B}$OB$_{3B}$:80SiOB$_{2B}$:7,500HB$_{2B}$O

The source of silica was silicic acid. The silicic acid was produced by passing a solution containing 25.00 g of sodium silicate in 57.37 g of DI water through a column containing the cation exchange resin, Dowex 650C(H$^+$) (available from Dow Chemical Company). About 40 ml, of resin for 100 g of diluted sodium silicate solution was used. Aluminum chlorohydrate (50%) solution was used as the source of alumina. The aluminum chlorohydrate was added directly to the silicic acid.

A five-neck reactor vessel equipped with a mechanical stirrer and reflux condenser was charged with an about 15 wt % solution of TPAOH and heated to 90° C. To this the silicic acid/aluminum chlorohydrate solution was added over 1.25 h. A clear solution resulted, which was heated under reflux for 30 h. The reaction was monitored over the 30 h by periodically checking particle size with QELS. The material was characterized after 30 h of reflux at 90° C. and after calcining at 550° C. for 5-7 h in air. The reflux material will be designated as 30 h reflux material throughout the text.
Preparation of Meso-ZSM-5

Further processing of the 30 h reflux material prepared above was carried out by transferring a portion to a Teflon-lined autoclave and heating at 100° C. for 1 d and 7 d. The 1 d and 7 d autoclave materials were characterized after heating in the autoclave and after calcining at 550° C. for 5-7 h in air. The autoclave materials will be designated as 1 d and 7 d autoclave materials throughout the text.

Product Characterization: Particle size analysis of the 30 h refluxed material was carried out with a Coulter N4 Plus Submicron Particle Sizer. Samples were run as is. PXRD on the calcined samples were performed with a Philips PANalytical X'Pert Pro 3040 using Co Kα radiation with a wavelength of 1.78897 Å. Nitrogen sorption measurements were performed with an Autosorb-1C from Quantachrome with micropore capability. Each sample was calcined and then degassed for 16 h at 180° C., except for the samples containing organic which were degassed for 16 h at 120° C. Each sample was characterized by multi-point BET surface area, total pore volume, t-plot micropore volume and micropore surface area, t-plot external surface area, BJH adsorption pore size distribution and HK micropore size distribution. FT-IR measurements were performed on a Nicolet Model 710 or a Nicolet Avatar 380 instrument by introducing the sample into a KBr pellet. TGA measurements were performed on a TA instrument Model TGA2950 by heating the sample to 1,000° C. in air at a rate of 10° C./min. The SEM micrograph of the 30 h reflux material was taken with a Cambridge 250 Mark III with a Noran Voyager II EDS System. SEM of the 7 d reflux material was taken on a Hitachi FE S4800. The sample was placed on an adhesive conductive carbon disk mounted on an aluminum stud. The sample was coated with 5 nm of Au/Pd. TEM was performed on a JOEL TEM-2100F Field Emission Electron Microscope. Sample preparation involved sonication in ethanol and dispersing on a holey carbon copper grid. Galbraith Laboratory performed ICP analyses for all samples.

Reflux Material: A clear solution was obtained after the final addition of silicic acid/aluminum chlorohydrate to the heel containing TPAOH. The reaction was stirred under reflux for an additional 30 h. QELS data shows an almost linear growth from 4 h to 24 h with particle diameters of 15 nm and 232 nm, respectively. A slight decrease in particle diameter is observed after 30 h (216 nm), indicating the end of the reaction in terms of particle growth. Visually, the material begins to show a slight haze at ca. 4 h and then turns increasingly hazy until a white colloidal material remains after 30 h. Similar observations are noticed when colloidal silica particles are grown to large sizes (e.g., >70 nm in diameter). The 30 h reflux material was also very stable in solution as the beginning of sedimentation took up to 3 months.

A Type IV isotherm was generated which is typical for mesoporous materials. More specifically, the isotherm is similar to those obtained from silica gels generated by a two-step acid-base catalyzed xerogel. {Brinker, 1990 #41} The surface area of the 30 h reflux material was 942 m$^2$/g with a total pore volume of 0.79 cm$^3$/g. These values are also similar to those achieved from two-step acid-base catalyzed xerogels. {Brinker, 1990 #41} In comparison to our TPA$^+$ template synthesized 30 h reflux material, a two-step acid-base catalyzed xerogel involves the generation of silica clusters that compact into larger, globular structures upon solvent removal. There are typically two pore sizes associated with xerogel material consisting of micropores from within the silica clusters and mesopores from between the larger, globular structures. Although the 30 h reflux material is generated from the addition of silicic acid/aluminum chlorohydrate to TPA$^+$, it may be possible to generate micropores by the removal of TPA$^+$ from the small amount of ZSM-5 that is present and mesopores from the soft packing of smaller primary particles that make up the larger colloids. The existence of smaller primary particles may explain the previous QELS data as the larger colloidal particles continue to grow during reflux after all the silicic acid/aluminum chlorohydrate has been added To explore the possibility of a micropore structure in the calcined 30 h reflux material, t-plot data was generated, along with the HK micropore size distribution plot. The t-plot micropore volume was 0.042 cm$^3$/g, which is significantly lower than the micropore volumes for large particle ZSM-5 materials, ca. 0.15 cm$^3$/g. {Groen, 2004 #44} {Kim, 2003 #7} Similarly, the t-plot micropore surface area of 40 m$^2$/g is considerably lower than ~300-400 m$^2$/g for large particle ZSM-5 materials. That leaves an extremely high t-plot external surface area of 902 m$^2$/g and pore volume of 0.75 cm$^3$/g for the calcined 30 h reflux material. An HK micropore distribution plot was produced to determine the pore size of the micropores in the 30 h reflux material. The HK plot exhibits a sharp peak at ca. 0.46 nm, which is similar to values obtained by large particle ZSM-5 materials. Unlike large particle ZSM-5 materials, there is BJH adsorption pore size plot of a fairly narrow peak centered at ca. 4.0 nm which is in the mesopore size regime.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention is claimed as:

1. A method of preparing a mesoporous zeolite material, the method consisting of: (a) forming template-occluded primary metal-doped silicate particles having an amorphous structure by adding a solution consisting of water, silicic acid and a cationic metal component, to a heel solution consisting of water and a template stabilizer that is tetraalkylammonium hydroxide, at a temperature and for a period of time sufficient to form colloidal particles; (b) aggregating the particles of step (a) into mesoporous agglomerates via refluxing at a temperature and for a time sufficient to cause agglomeration of the particles into mesoporous agglomerates; (c) transforming the amorphous structure into a microporous nanocrystalline zeolite structure, thereby forming a mesoporous zeolitic material; and (d) removing the template of step (a) to form the mesoporous zeolite material.

2. The method of claim 1, wherein the template-occluded primary metal-doped silicate particles contain a metal selected from the group consisting of: an alkali metal; an alkaline earth metal; a 1st row transition metal; a 2nd row transition metal; a lanthanide; and any combinations of the foregoing.

3. The method of claim 1, wherein the template-occluded primary metal-doped silicate particles contain a metal selected from the group consisting of: aluminum; cerium; titanium; tin; zirconium; zinc; copper; nickel; molybdenum; iron; rhenium; vanadium; boron; and any combinations of the foregoing.

4. The method of claim 1, wherein said template stabilizer is selected from the group consisting of: tetramethylammonium hydroxide (TMAOH); tetrapropylammonium hydroxide (TPAOH); tetraethylammonium hydroxide (TEAOH); tetrabutylammonium hydroxide (TBAOH); tetrahexylammonium hydroxide; tetraoctylammonium hydroxide; tributylmethylammonium hydroxide; triethylmethylammonium hydroxide; trimethylphenylammonium hydroxide; methyltripropylammonium hydroxide; dodecyltrimethylammonium hydroxide; hexadecyltrimethylammonium hydroxide; dimethyldodecylethylammonium hydroxide; diethyldimethylammonium hydroxide; and any combinations of the foregoing.

5. The method of claim 1, wherein transforming the amorphous structure into a microporous nanocrystalline zeolite structure further comprises subjecting the mesoporous agglomerates of step (b) to heat treatment at a temperature and for a period of time sufficient to cause transformation of said amorphous structure into a microporous nanocrystalline zeolite structure.

6. The method of claim 1, wherein transforming the amorphous structure into a microporous nanocrystalline zeolite structure further comprises adding in step (c) an inorganic salt solution with an ionic strength sufficient to cause said particle agglomeration of step (b).

7. The method of claim 1, wherein mesoporous zeolite material of step (d) is obtained by calcining the material prepared in step (c) at a temperature and for a time sufficient to remove the template from the zeolite material.

* * * * *